United States Patent [19]
Arai et al.

[11] Patent Number: 5,794,786
[45] Date of Patent: Aug. 18, 1998

[54] METHOD AND APPARATUS FOR SORTING SOLIDS BY AIRSTREAM

[75] Inventors: Satoshi Arai; Shinichi Ito; Hiroshi Sakamoto; Eisetsu Oi; Hiroki Yotsumoto, all of Tsukuba, Japan

[73] Assignee: Agency of Industrial Science and Technology, Tokyo, Japan

[21] Appl. No.: 399,600

[22] Filed: Mar. 7, 1995

[30] Foreign Application Priority Data

Mar. 18, 1994 [JP] Japan .................. 6-074300

[51] Int. Cl.$^6$ ........................................ B07B 9/00
[52] U.S. Cl. .................. 209/29; 209/139.1; 209/154; 209/930
[58] Field of Search ............... 209/28, 29, 138, 209/133, 139.1, 140, 141, 154, 930

[56] References Cited

U.S. PATENT DOCUMENTS

| | | | |
|---|---|---|---|
| 1,593,729 | 7/1926 | Stebbins | 209/29 |
| 1,661,299 | 3/1928 | Peron | 209/29 |
| 2,679,316 | 5/1954 | Ruepp | 209/139.1 X |
| 2,852,137 | 9/1958 | Hagopian | 209/139.1 |

FOREIGN PATENT DOCUMENTS 1776457  11/1992  U.S.S.R. .................. 209/29

*Primary Examiner*—William E. Terrell
*Assistant Examiner*—Tuan N. Nguyen
*Attorney, Agent, or Firm*—Oblon, Spivak, McClelland, Maier & Neustadt, P.C.

[57] ABSTRACT

An airstream solid sorting technology easily and efficiently sorts electric wire and other slender objects from other unslender objects in crushed bulk wastes. A mixture of slender and unslender objects is supplied into an airstream sorting vessel, in which a turbulent stream of gas supplied from below through a meshed screen tilted in its bottom agitates the mixture. Slender objects stalling and falling longitudinally in the direction in which gravity works pass through the meshed screen, thus falling into a slender objects collecting vessel placed below the meshed screen. Unslender objects sliding down along the tilted meshed screen are thus separated.

10 Claims, 1 Drawing Sheet

5,794,786

METHOD AND APPARATUS FOR SORTING SOLIDS BY AIRSTREAM

FIELD OF THE INVENTION

Valuables recovered for recycling from crushed pieces of such bulk wastes as discarded household electrical appliances and automobiles must be sorted and classified according to types of their materials. Particularly, slender pieces of copper cut from electromagnet coils and covered electric wire have relatively high values. However, there have been no appropriate technologies for sorting such slender objects from unslender ones.

This invention relates to a method and an apparatus for sorting solids by airstream that can separate slender pieces of copper of high added-values from unslender pieces by noting the difference in shape.

DESCRIPTION OF THE PRIOR ART

Discarded household electrical appliances and automobiles contain various kinds of motors, coils, electric wires, etc. For recycling, such pieces must be disassembled, crushed and sorted out by types of materials. However, conventional sorting technologies using wind force, jigs, tables, fluidized beds, cyclones, etc. cannot sort out crushed pieces of coils and covered wire with high efficiency and accuracy. On the other hand, conventional wet classifying technologies require some post treatments including drying. Therefore, development of an efficient dry classifying technology requiring no post-treatment has been awaited.

SUMMARY OF THE INVENTION

An object of this invention is to provide a method and apparatus for sorting solids by airstream that permits easy and efficient sorting of slender objects consisting essentially of copper in a dry state from crushed pieces of such bulk wastes as discarded household electrical appliances and automobiles.

Another object of this invention is to provide a method and apparatus for sorting slender objects by airstream by taking advantage of the tendency of slender objects to fall vertically or longitudinally, with the length thereof parallel to the direction in which works, when a mixture of needle-shaped and unslender objects is exposed to an up-coming airstream in an airstream sorting vessel.

Still another object of this invention is to provide a method and apparatus for efficiently sorting slender objects from unslender ones by causing them to float and fall in an airstream whose flow speed is intermittently varied.

Yet another object of this invention is to provide a method and apparatus for further sorting the separated unslender objects into less floatable objects and more floatable ones by airstream in a secondary unslender object sorting vessel provided next to the primary sorting vessel.

To achieve the above objects, an airstream sorting method according to this invention essentially comprises supplying a mixture of slender and unslender objects into an airstream sorting vessel flaring upward, into which turbulent airstream is supplied from below through a meshed screen tilted in the bottom of the vessel. When the upcoming airstream agitates the mixture in the vessel, slender objects stalling longitudinally fall through the meshed screen into a collecting vessel placed therebelow, whereas unslender objects flow down along the tilted meshed screen to the outside.

An airstream sorting apparatus according to this invention comprises an upwardly flaring airstream sorting vessel into which a mixture of slender and unslender objects to be sorted is supplied, a meshed screen tilted in the bottom of the sorting vessel whose meshes are large enough to pass the slender objects falling longitudinally but not large enough to pass any other larger objects, a slender objects collecting vessel placed below the meshed screen and having an opening to supply an airstream to agitate the mixture of slender and unslender objects, and an outlet for the unslender objects opened at the lower end of the tilted meshed screen.

An unslender objects sorting apparatus may be provided downstream of the airstream sorting vessel and needle-shaped objects collecting vessel described above to re-sort the separated unslender objects into more floatable and less floatable objects by using an airstream.

In the airstream sorting apparatus described above, a required amount of air is supplied through the air-supply port from below the meshed screen into the sorting vessel. The upcoming turbulent airstream floats and agitates the mixture of need-shaped and unslender objects. Even the readily floatable objects do not scatter away during moving as the upwardly flaring vessel rapidly decreases the flow speed of the ascending airstream.

The mixture float and fall repeatedly in the airstream. In the stalling and falling stage, slender objects turn upright in the direction in which gravity acts, thus loosing their buoyancy and falling through the meshed screen disposed in the bottom. Then, the mixture is sorted into the slender objects passed through the meshed screen and the unslender objects that remain thereon.

The sorting method and apparatus of this invention thus easily and efficiently sort slender objects from crushed wastes of such bulk wastes as used household electrical appliances and automobiles in a dry state by taking advantages of the difference in shape.

DESCRIPTION OF THE PREFERRED EMBODIMENTS

Now a preferred embodiment of this invention will be described in detail by reference to the accompanying drawings.

Figure 1:
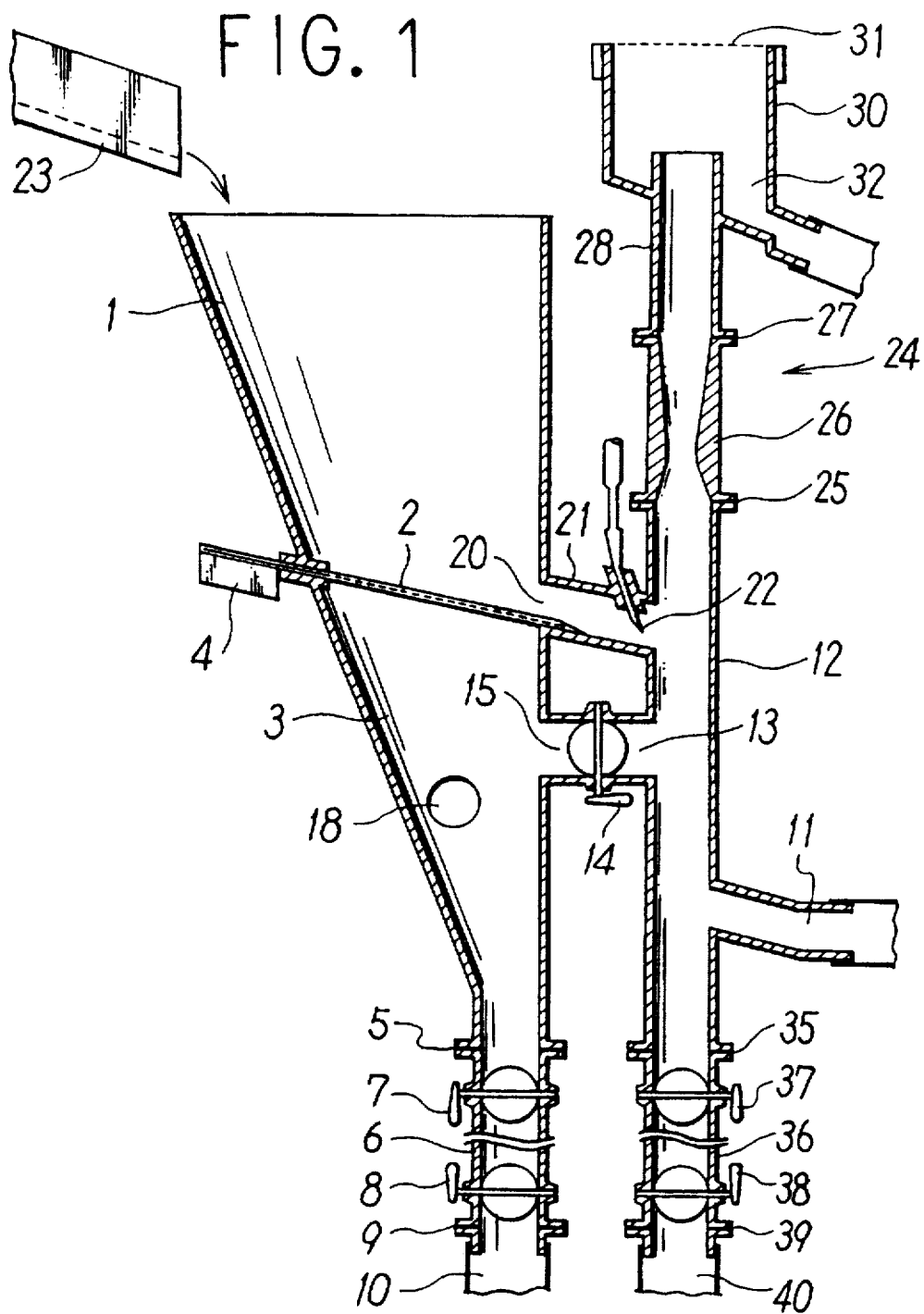
FIG. 1 is a cross-sectional side elevation of an airstream sorting apparatus according to this invention.
Figure 2:
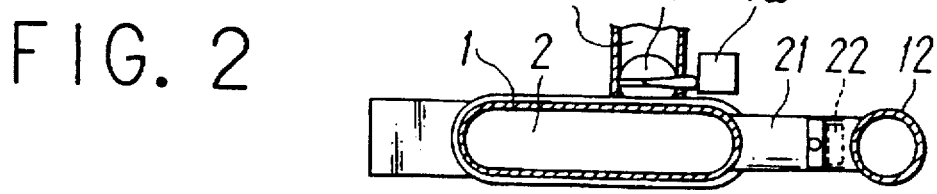
FIG. 2 is a cross-sectional top view of the same airstream sorting apparatus.

An airstream solid sorting apparatus according to this invention shown in FIGS. 1 and 2 is used for sorting slender objects from unslender objects resulting from the crushing of coils and electric wires in coils and other parts of such wastes as used household electric appliances and automobiles that are disassembled, crushed and sorted for recycling. The airstream solid sorting apparatus comprises an upwardly flaring sorting vessel 1 into which a mixture of slender and unslender objects to be sorted is supplied, a meshed screen 2 tilted in the bottom of the vessel 1, and a slender objects collecting vessel 3 placed below the meshed screen 2.

The airstream sorting vessel 1 having an open top end and an upwardly flaring body decreases the flow speed of an airstream supplied from below the collecting vessel 3 and meshed screen 2 and ascending through the vessel 1. The meshed screen 2 tilted in the bottom of the sorting vessel 1 may be made of a perforated plate or a framed grid of wire netting. The mesh size is large enough to pass the slender objects falling longitudinally in the direction in which gravity works and not large enough to pass other larger objects.

A vibrator 4 to vibrate the meshed screen 2 to facilitate the motion of the unslender objects may be connected to the airstream sorting vessel 1 or meshed screen 2.

The slender objects collecting vessel 3 placed below the meshed screen 2 hold the slender objects sorted through the meshed screen 2, whereas an airstream is supplied through the collecting vessel 3 and meshed screen 2 into the sorting vessel 1. A recovery cylinder 6 having a space to temporarily hold the slender objects formed between two movable dampers 7 and 8 is connected to the lower end of the collecting vessel 3 through a flanged joint 5. A slender objects discharge cylinder 10 is connected to the recovery cylinder 6 through a flanged joint 9.

The airstream sorting vessel 1 and slender objects collecting vessel 3 may be made of carbon steel, stainless steel, aluminum or other metal, plastics, or mixtures thereof.

The slender objects collecting vessel 3 has a primary gas inlet 15 through which a primary gas supplied through a primary gas supply pipe 11, a gas supply cylinder 12 and a branch cylinder 13 having a damper 14 is introduced. The damper 14 controls the volume of the primary gas supplied through the branch cylinder 13. The slender objects collecting vessel 3 also has an inlet 18 at which a secondary gas supply pipe 16 (see FIG. 2) having a damper 17 opens. The supply pipe 16 intermittently supplies a secondary gas from a separately prepared blower through the inlet 18 by intermittently opening and closing the damper 17 be means of a drive unit 17a. The intermittently supplied gas forces the objects to be sorted to float and fall repeatedly.

An unslender objects outlet 20 to discharge the sorted unslender objects from the airstream sorting vessel 1 opens at the lower end of the tilted meshed screen 2 in the airstream sorting vessel 1 to which the sorted unslender objects flow down. A discharge pipe 21 connects the outlet 20 to the gas supply cylinder 12. The discharge pipe 21 has a compressed gas supply nozzle 22 to supply a laminar stream of compressed gas from a separately prepared compressor or other gas supply unit. The nozzle 22 is vertically slidable to adjust the amount of opening in the outlet 20 according to the size of the objects to be discharged from the airstream sorting vessel 1. A vibrating feeder 23 which supplies a mixture of slender and unslender objects is disposed above the upper end of the meshed screen 2 tilted in the airstream sorting vessel 1.

The airstream sorting apparatus described here also has a unslender objects sorting apparatus 24 that is disposed alongside the airstream sorting vessel 1 and the slender objects collecting vessel 3 disposed therebelow. An accelerating cylinder 26 having a constricted interior is connected to above the point where the discharge pipe 21 is connected to the gas supply cylinder 12 through a flanged joint 25. A cylinder 28 is disposed thereabove through a flanged joint 27. The cylinder 28 has an integrally formed floating objects collecting cylinder 30 with a greater cross-sectional area that has a meshed screen 31 to cover the top thereof to prevent the scattering of floating objects and an annular channel 32 provided therearound to discharge the floating objects.

A recovery cylinder 36 having a space to temporarily collect unslender objects formed between two vertically spaced movable dampers 37 and 38 is connected to below the joint between the gas supply cylinder 12 and gas supply pipe 11 through a flanged joint 35. Also, an unslender objects discharge cylinder 40 is connected to the recovery cylinder 36 through a flanged joint 39.

To perform sorting using the airstream sorting apparatus described above, a required amount of air is supplied from a separate blower to the primary gas supply pipe 11, while a compressed gas supply nozzle 22 emits a laminar stream of compressed gas from the compressed gas supply unit to prevent the reversing of the primary gas into the discharge pipe 21. The opening of the damper 14 is then adjusted to supply an appropriate amount of air for moving and sorting a mixture of slender and unslender objects in the airstream sorting vessel 1 from the gas supply cylinder 12 through the branch cylinder 13 and the slender objects collecting vessel 3. At this time, the dampers 7 and 8 in the slender objects recovery cylinder 6 and the dampers 37 and 38 in the unslender objects recovery cylinder 36 are closed.

In this state, the vibrating feeder 23 at the top of the airstream sorting vessel 1 supplies a mixture of slender and unslender objects to the higher end of the tilted meshed screen 2. Then, a turbulent air flow supplied from below the meshed screen 2 floats the mixture thereover in the airstream sorting vessel 1.

The volume of air supplied to the airstream sorting vessel 1 must be large enough to cause the mixture to repeat floating and stalling. Although the mixture sometimes contains highly floatable objects, even such objects do not scatter away because the upwardly flaring airstream sorting vessel 1 greatly decreases the flow speed of the ascending airstream.

The updraft floats the mixture of slender and unslender objects supplied to the higher end of the tilted meshed screen 2 on the left of the airstream sorting vessel 1 shown in FIG. 1. Because the buoyancy of the updraft is relatively small, the objects stall and fall soon, and then float again, thus repeating the cycle. Stalling slender objects have a tendency to fall longitudinally in the direction in which gravity works. Slender objects falling in this way pass through the meshes of the meshed screen 2 into the slender objects collecting vessel 3 and collect on the damper 7 disposed therebelow.

Non-slender objects move downward (to the right in FIG. 1) over the tilted meshed screen 2 while repeating ascending and descending and finally reaches the unslender objects outlet 20. The laminar stream of compressed air emitted from the compressed gas supply nozzle 22 carries the unslender objects to the gas supply cylinder 12.

If necessary, the airstream sorting vessel 1 or the meshed screen 2 may be vibrated to facilitate the travel of the unslender objects in the airstream sorting vessel 1.

The slender objects collecting on the damper 7 in the slender objects collecting vessel 3 are dropped onto the damper 8 by opening the damper 7 at appropriate intervals. After closing the damper 7 and opening the damper 8, the slender objects are then discharged from the slender objects discharge cylinder 10 directly onto a discharge conveyor, feeder or hopper. Thus, the slender objects are taken out without affecting the flow of the airstream in the slender objects collecting vessel 3.

When the unslender objects reach the gas supply cylinder 12, less floatable objects stall and fall through the gas supply cylinder 12 onto the damper 37, whereas more floatable objects are accelerated in the accelerating cylinder 26 and move up to the floating objects collecting cylinder 30 through the cylinder 28. With the flow speed of the airstream greatly decreased in the cylinder 30 having a large cross-sectional area, the floating objects are discharged from the annular channel 32. The floating objects thus discharged may be transferred directly onto a belt conveyor, feeder, hopper or chute.

Like the slender objects on the damper 7, the less floatable objects collecting on the damper 37 are dropped onto the damper 38 by opening the damper 37. By opening the damper 38 after closing the damper 37, the less floatable objects may then be transferred directly onto a belt conveyor, feeder or hopper.

The airstream sorting apparatus just described can intermittently supply a required amount of secondary gas by closing the damper 14 in the branch cylinder 13, supplying a secondary gas from a separately prepared blower through the secondary gas supply pipe 16, and intermittently opening the damper 17. This intermittent supply of the secondary gas provides more efficient sorting by forcibly floating and dropping the objects to be sorted.

What is claimed is:

1. An airstream solid sorting method for sorting slender objects from unslender objects in crushed wastes in a dry state, the method comprising the steps of:

supplying a mixture of slender and unslender objects into an upwardly flaring airstream sorting vessel;

allowing the mixture to flow in the airstream sorting vessel by supplying a turbulent airstream from below through a meshed screen tilted at the bottom of the airstream sorting vessel;

collecting the slender objects stalling and falling longitudinally in a direction in which gravity works and passing through the meshed screen into a slender objects collecting vessel disposed therebelow; and separating and discharging the unslender objects flowing along the tilted meshed screen.

2. An airstream solid sorting method according to claim 1, which comprises the further steps of:

supplying an airstream to move the mixture of slender and unslender objects into the slender objects collecting vessel below the meshed screen through a branch cylinder branched from a gas cylinder of an unslender objects sorting apparatus placed alongside the airstream sorting vessel and the slender objects collecting vessel;

supplying the unslender objects flowing down along the tilted meshed screen in the airstream sorting vessel into the gas cylinder of the unslender objects sorting apparatus at a point above the opening of the branch cylinder; and collecting in a floating objects collecting cylinder having a larger cross-section area lighter objects, of said unslender objects, which stall and fall under an influence of the airstream supplied through the gas cylinder and are accelerated by a constricted interior of an accelerating cylinder disposed above the gas cylinder, while collecting heavier objects of said unslender objects that remain unfloated in a lower part of the gas cylinder.

3. An airstream solid sorting method according to claim 1 or 2, which comprises the further step of:

controlling an amount of the gas to be supplied from below into the airstream sorting vessel to a level sufficient for causing the objects to be sorted to repeat the stalling in a lower part of the sorting vessel with a smaller cross-sectional area and the stalling and falling in the lower part of the sorting vessel with a larger cross-sectional area by means of a damper provided in a gas supply port.

4. An airstream solid sorting method according to claim 1, which comprises the further step of:

forcibly floating and dropping the unsorted objects in an intermittent airstream produced by intermittently varying a flow rate of the gas supplied from below into the airstream sorting vessel by intermittently opening and closing a damper provided in a gas supply port.

5. An airstream solid sorting apparatus for sorting objects from unslender objects in crushed wastes in a dry state comprising:

an upwardly flaring airstream sorting vessel into which a mixture of slender and unslender objects is supplied;

a meshed screen tilted in a bottom of the airstream sorting vessel which permits the slender objects falling longitudinally in the direction in which gravity works to pass therethrough without permitting other larger objects to pass therethrough;

a slender objects collecting vessel disposed below the meshed screen and having a port to supply a gas to agitate the mixture being sorted;

an unslender objects outlet opening at a lower end of the tilted meshed screen in the airstream sorting vessel;

an unslender objects sorting apparatus disposed alongside the airstream sorting vessel and an unslender objects collecting vessel disposed therebelow;

the unslender objects sorting apparatus being made up of a gas supply cylinder into which a gas supply pipe from a blower opens, with an upper end of the gas supply cylinder being connected to an accelerating cylinder with a constricted interior, an upper end of the accelerating cylinder being, in turn, connected to a floating objects collecting cylinder having a larger cross-sectional area and an annular channel to discharge floating objects, and a lower end thereof being connected to an unslender objects discharge cylinder to discharge heavier unslender objects;

a branch cylinder communicating with a gas inlet in the slender objects collecting vessel which is branched from the gas supply cylinder at a point higher than where the gas supply pipe opens into the gas supply cylinder; and an unslender objects outlet opening in the airstream sorting vessel and connected to the gas supply cylinder at a point where the branch cylinder opens.

6. An airstream solid sorting apparatus according to claim 5, which comprises:

a damper controlling a flow rate of the gas supply disposed in the gas supply port in the slender objects collecting vessel below the airstream sorting vessel.

7. An airstream solid sorting apparatus according to claim 5, which comprises:

a compressed gas supply nozzle to supply a laminar stream of compressed air from a supply source to prevent a reversing of the gas flow from the gas supply cylinder to the airstream sorting vessel provided in a discharge pipe connected to the unslender objects outlet in the airstream sorting vessel.

8. An airstream solid sorting apparatus according to claim 5, which comprises:

a vibrator to facilitate a travel of the unslender objects connected to the meshed screen in the bottom of the airstream sorting vessel.

9. An airstream solid sorting apparatus according to claim 5, which comprises:

two movable dampers provided, one on top of the other, in a lower passage in the slender objects collecting vessel below the airstream sorting vessel, the two movable dampers forming a space to temporarily hold the slender objects therebetween, with a slender objects discharge cylinder connected therebelow.

10. An airstream solid sorting apparatus according to claim 5, which comprises:

a damper provided in a gas supply pipe opening in the slender objects collecting vessel below the airstream sorting vessel to intermittently increase and decrease a flow rate of the gas from a blower.

* * * * *